United States Patent
Balagurusamy et al.

(10) Patent No.: US 11,815,465 B2
(45) Date of Patent: Nov. 14, 2023

(54) PORTABLE HIGH-RESOLUTION GEM IMAGING SYSTEM

(71) Applicant: Gemological Institute of America, Inc. (GIA), Carlsbad, CA (US)

(72) Inventors: Venkat K. Balagurusamy, Suffern, NY (US); Brian Pear, Newtown, CT (US); Edward J. Maggiacomo, Pleasant Valley, NY (US); Thomas Picunko, Scarsdale, NY (US); Joseph Ligman, Wilton, CT (US); Donna N. Eng Dillenberger, Yorktown Heights, NY (US)

(73) Assignee: Gemological Institute of America, Inc. (GIA), Carlsbad, CA (US)

( * ) Notice: Subject to any disclaimer, the term of this patent is extended or adjusted under 35 U.S.C. 154(b) by 721 days.

(21) Appl. No.: 16/393,032

(22) Filed: Apr. 24, 2019

(65) Prior Publication Data

US 2020/0340927 A1 Oct. 29, 2020
US 2023/0243757 A9 Aug. 3, 2023

(51) Int. Cl.
*G01N 21/87* (2006.01)
*G06T 7/00* (2017.01)
*H04N 23/56* (2023.01)
*H04N 23/55* (2023.01)

(52) U.S. Cl.
CPC ........... *G01N 21/87* (2013.01); *G06T 7/0004* (2013.01); *H04N 23/55* (2023.01); *H04N 23/56* (2023.01); *G01N 2201/0221* (2013.01)

(58) Field of Classification Search
None
See application file for complete search history.

(56) References Cited

U.S. PATENT DOCUMENTS

| | | | |
|---|---|---|---|
| 5,118,181 A | 6/1992 | Yifrach et al. | |
| 5,615,005 A | 3/1997 | Valente et al. | |
| 5,828,908 A * | 10/1998 | Mauchan | G03B 15/06 |
| | | | 396/3 |
| 5,835,205 A | 11/1998 | Hunter et al. | |
| 6,239,867 B1 | 5/2001 | Aggarwal | |
| 6,473,164 B1 | 10/2002 | De et al. | |
| 6,509,559 B1 | 1/2003 | Ulrich et al. | |
| 6,870,606 B2 | 3/2005 | Klingler | |

(Continued)

FOREIGN PATENT DOCUMENTS

| | | |
|---|---|---|
| AU | 2017200620 A1 | 11/2017 |
| CA | 2890047 A1 | 5/2014 |

(Continued)

OTHER PUBLICATIONS

List of all IBM related dockets. Appendix P. 2019.

(Continued)

*Primary Examiner* — Rodney E Fuller
(74) *Attorney, Agent, or Firm* — DLA Piper LLP (US)

(57) ABSTRACT

A gem imaging system includes a stage having a platform configured to hold an object. The system further includes a light source configured to illuminate the object. The system further includes a housing configured to at least partially enclose the object. The housing is configured to position a mobile device such that a camera lens of the mobile device is aligned with the object.

20 Claims, 8 Drawing Sheets

(56) References Cited

U.S. PATENT DOCUMENTS

| | | | |
|---|---|---|---|
| 6,969,033 B2* | 11/2005 | van der Linden | F16M 11/08 396/419 |
| 6,980,283 B1 | 12/2005 | Aggarwal | |
| 7,102,742 B2 | 9/2006 | Geurts | |
| 7,652,755 B2 | 1/2010 | Liu | |
| 7,855,732 B2* | 12/2010 | Williams | G06F 3/04812 348/211.7 |
| 8,658,134 B2 | 2/2014 | Chirila et al. | |
| 9,008,832 B2 | 4/2015 | Lo | |
| 9,239,294 B2 | 1/2016 | Wagner et al. | |
| 9,678,018 B2* | 6/2017 | Takahashi | G01N 21/87 |
| 9,953,406 B2* | 4/2018 | Verboven | G06T 7/0004 |
| 10,107,757 B2 | 10/2018 | Takahashi | |
| 10,412,810 B2* | 9/2019 | Hwang | H05B 47/10 |
| 10,416,432 B2* | 9/2019 | Balagurusamy | G02B 21/361 |
| 10,488,341 B2 | 11/2019 | Takahashi | |
| 10,783,624 B2* | 9/2020 | Weiss | H04N 5/2256 |
| 10,890,531 B2 | 1/2021 | Takahashi | |
| 11,016,032 B2* | 5/2021 | Kerner | G01N 21/87 |
| 11,300,514 B2 | 4/2022 | Takahashi | |
| 11,630,065 B2 | 4/2023 | Takahashi | |
| 2003/0107722 A1 | 6/2003 | Klingler | |
| 2004/0072137 A1 | 4/2004 | Lapa et al. | |
| 2005/0190356 A1* | 9/2005 | Sasian | G01N 21/87 356/30 |
| 2005/0190357 A1* | 9/2005 | Sasian | G01N 21/8806 356/30 |
| 2006/0180775 A1* | 8/2006 | Paradis | G01N 21/909 250/559.42 |
| 2007/0285650 A1 | 12/2007 | Kerner et al. | |
| 2009/0116082 A1 | 5/2009 | Osa et al. | |
| 2009/0182520 A1 | 7/2009 | Luxembourg et al. | |
| 2010/0085635 A1* | 4/2010 | Verboven | G01N 21/87 359/387 |
| 2011/0212717 A1 | 9/2011 | Rhoads et al. | |
| 2011/0228063 A1 | 9/2011 | Smith et al. | |
| 2011/0310246 A1 | 12/2011 | Hornabrook et al. | |
| 2012/0007971 A1 | 1/2012 | Schnitzer et al. | |
| 2012/0086950 A1* | 4/2012 | Sho | G06T 7/521 356/601 |
| 2012/0087566 A1* | 4/2012 | Mori | G06T 7/0004 382/141 |
| 2012/0281301 A1* | 11/2012 | Tang | G02B 13/0045 359/717 |
| 2013/0016210 A1* | 1/2013 | Smith | G01N 21/87 348/135 |
| 2013/0208085 A1 | 8/2013 | Marion et al. | |
| 2014/0086567 A1* | 3/2014 | Feke | G01N 21/6456 396/4 |
| 2014/0098370 A1 | 4/2014 | Ahner et al. | |
| 2015/0346108 A1 | 12/2015 | Palmieri et al. | |
| 2016/0015264 A1 | 1/2016 | Pankajakshan et al. | |
| 2016/0232432 A1 | 8/2016 | Regev | |
| 2016/0290925 A1* | 10/2016 | Takahashi | G01N 21/87 |
| 2016/0363576 A1 | 12/2016 | Zhu et al. | |
| 2017/0241913 A1 | 8/2017 | Gu | |
| 2017/0322082 A1 | 11/2017 | Li | |
| 2017/0330321 A1* | 11/2017 | Hsu | A61B 5/43 |
| 2017/0343493 A1 | 11/2017 | Reischig | |
| 2017/0363546 A1* | 12/2017 | Palmieri | G01N 21/66 |
| 2018/0130197 A1* | 5/2018 | Weiss | H04N 5/247 |
| 2018/0210323 A1* | 7/2018 | Ahn | G02B 21/34 |
| 2019/0053352 A1* | 2/2019 | Hwang | H05B 47/10 |
| 2019/0137399 A1 | 5/2019 | Takahashi | |
| 2019/0289189 A1* | 9/2019 | Inazumi | G03F 7/20 |
| 2019/0384050 A1* | 12/2019 | Balagurusamy | G02B 21/0008 |
| 2020/0064267 A1 | 2/2020 | Takahashi | |
| 2020/0150050 A1* | 5/2020 | Thobe | H04N 5/2253 |
| 2020/0333260 A1* | 10/2020 | Yamada | G01N 21/8806 |
| 2021/0356402 A1* | 11/2021 | Kerner | G01N 21/87 |

FOREIGN PATENT DOCUMENTS

| | | |
|---|---|---|
| CN | 1304035 A | 7/2001 |
| CN | 1398346 A | 2/2003 |
| CN | 102175687 A | 9/2011 |
| CN | 102216759 A | 10/2011 |
| CN | 106124510 A | 11/2016 |
| CN | 106405814 * | 2/2017 |
| CN | 106405814 A | 2/2017 |
| CN | 106662535 A | 5/2017 |
| CN | 206773290 U | 12/2017 |
| CN | 108982506 * | 12/2018 |
| CN | 108982506 A | 12/2018 |
| CN | 107771280 B | 10/2021 |
| CN | 110726722 B | 12/2022 |
| EP | 3594664 A1 | 1/2020 |
| EP | 3278088 B1 | 12/2021 |
| GB | 2293236 A | 3/1996 |
| JP | H07239303 A | 9/1995 |
| JP | H07333158 A | 12/1995 |
| JP | 2003507735 A | 2/2003 |
| JP | 3392926 B2 | 3/2003 |
| JP | 2006208857 A | 8/2006 |
| JP | 2013034725 A | 2/2013 |
| JP | 2013518274 A | 5/2013 |
| JP | 2017138603 A | 8/2017 |
| JP | 6553738 B2 | 7/2019 |
| RU | 2009134802 A | 3/2011 |
| TW | 433463 U | 5/2001 |
| TW | 548401 B | 8/2003 |
| TW | I709742 B | 11/2020 |
| TW | I741825 B | 10/2021 |
| WO | WO-9704302 A1 | 2/1997 |
| WO | WO-0114854 A1 | 3/2001 |
| WO | 2008119125 A1 | 10/2008 |
| WO | WO-2010010375 A1 | 1/2010 |
| WO | WO-2011092493 A2 | 8/2011 |
| WO | WO-2016161016 A1 | 10/2016 |
| WO | 2017132678 A1 | 8/2017 |
| WO | 2018215823 A1 | 11/2018 |

OTHER PUBLICATIONS

Wang et al., "Automated Opal Grading by Imaging and Statistical Learning", 2015 IEEE.
List of All IBM Related Applications, Appendix P, 2019.
International Searching Authority, PCT/IB2020/051594, dated Jun. 4, 2020.
OA1, Application No. 202080016019.9, dated Mar. 25, 2022.
Intellectual Property Office, Examination Report, Application No. GB2113811.0, dated Apr. 8, 2022.
Application No. 202080016019.9, OA2, dated Aug. 24, 2022.
OA1 English Translation, Application No. 202080016019.9, dated Mar. 25, 2022.
Application No. GB2113811.0, Reply to Examination Report, dated Sep. 29, 2022.
Application No. 202080016019.9, Rejection Decision, dated Dec. 23, 2022.
Application No. 2021-546235, Receive Rejection, dated Mar. 13, 2022.
Application No. 2021-546235, Receive Rejection English Translation, dated Mar. 13, 2022.
Application No. 112020001127.5, OA, dated Nov. 10, 2022.
Application No. 112020001127.5, OA English Translation, dated Nov. 10, 2022.

* cited by examiner

PORTABLE HIGH-RESOLUTION GEM IMAGING SYSTEM

TECHNICAL FIELD

The present invention relates generally to a method, system, and computer program product for making a low-cost microscope using existing camera-enabled mobile devices. More particularly, the present invention relates to a method, system, and computer program product for a portable high-resolution gem imaging system.

BACKGROUND

Currently there are a large number of smart phone users around the world. Many of these smart phones are provided with high computing power, video streaming capabilities, high quality image capture capabilities and other processing capabilities. This presents an unprecedented opportunity for developing applications based on these capabilities, especially for sensing and imaging applications.

Diamond is a non-limiting example of a gemstone (gem) contemplated herein. There are a number of diamond imaging systems that are used for commercial applications for evaluating and characterizing diamond and gem stone quality and value. However, low-cost cellular phone-based portable imaging systems are quite rare and highly inadequate for commercial grading of gemstones.

SUMMARY

The illustrative embodiments provide a method, system, and computer program product. An embodiment of a gem imaging system includes a stage having a platform configured to hold an object. In an embodiment, the system further includes a light source configured to illuminate the object. In an embodiment, the system further includes a housing configured to at least partially enclose the object, wherein the housing is configured to position a mobile device such that a camera lens of the mobile device is aligned with the object.

In an embodiment, the system includes a microlens adapter configured to removably couple to the mobile device. In an embodiment, the system includes a microlens positioned in an aperture of the housing. In an embodiment, the microlens is one of a ball lens, a hemispherical lens, a hyperbolic lens, or an aspheric lens. In an embodiment, the system includes a second platform configured to support the mobile device.

In an embodiment, the second platform is movable relative to the stage. In an embodiment, the system includes an arm coupled to the housing. In an embodiment, the arm is configured to move the housing relative to the stage. In an embodiment, the stage is movable in increments of 10 to 100 microns.

In an embodiment, the housing includes a light reflector oriented relative to the platform such that light from the light source is reflected from the light reflector onto the object. In an embodiment, the light source is a lighting panel coupled to the housing.

In an embodiment, the system includes a motorized mechanism to move the platform in at least one direction to change a position of the gemstone relative to the mobile device. In an embodiment, the platform is configured to hold the object at a focal plane of a microlens.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
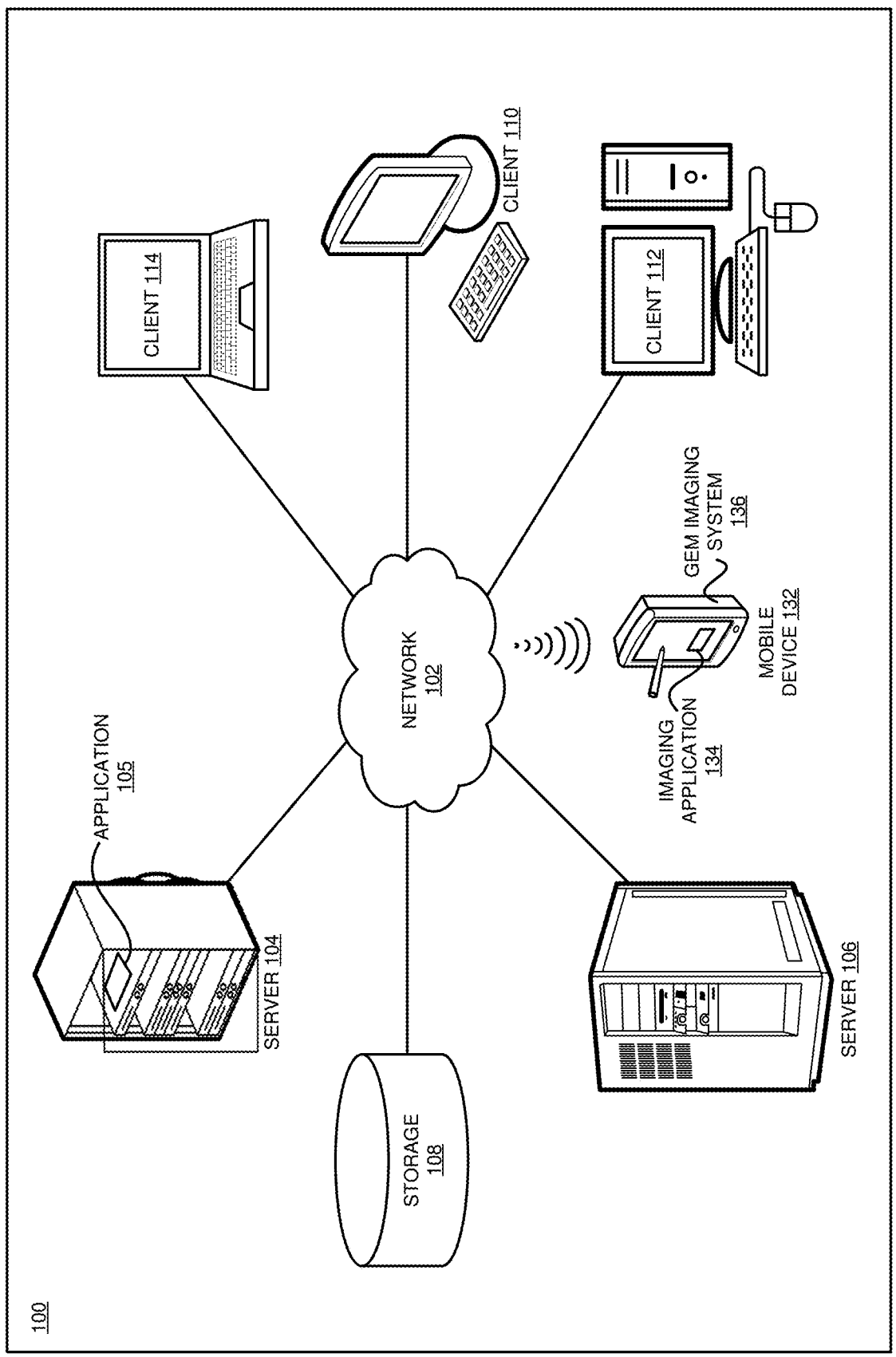
FIG. 1 depicts a block diagram of a network of data processing systems in which illustrative embodiments may be implemented.

Gemstone grading is a highly manual process, dependent upon the artisan's skill, level of experience, familiarity with gemstones and gemstone producing regions and techniques, and many other variables. Consequently, the grading of gemstones is often non-uniform and unreliable owing to the human-dependent variations in the grading process. Although grading standards have been developed and implemented by gemstone grading laboratories around the world, the grading process even with the standards is still very much human-dependent. For example, only a small fraction of the gems that are produced annually pass through those labs and an even smaller fraction is selected for grading according to the standards, not all standards are uniformly applied by human inspectors in each case, natural variations in gems render the grading to become highly subjective regardless of the standards, or some combination of these and other difficulties in standards-based grading. A need exists in the gemstone making and quality assurance technologies, for reliable, high-speed, and uniform gem grading system.

Various embodiments include a microlens adapter for mobile devices that enable high resolution image capture. In particular embodiments, the microlens adapter includes a microlens that enables image capture of micron sized (millionth of a meter) objects using a mobile device having high magnification of, for example, 15× or larger (for comparison a human hair width is 100 micron). Various embodiments provide for a wide range of image capture and processing applications such as tracking microbead motion within a fluid, diamond defect mapping and imaging, imaging bacterial and other cellular organisms and counterfeit goods detection and protection.

Presently available microscopes with 1-micron or better resolution are generally custom equipment that cost many thousands of dollars and are difficult to move or relocate from one observation site to another as they are quite bulky. The illustrative embodiments recognize that the presently available tools or solutions do not provide for portable gem imaging systems at a retailer. The illustrative embodiments recognize that the presently available tools or solutions do not address these needs/problems or provide adequate solutions for these needs/problems. The illustrative embodiments used to describe the invention generally address and solve the above-described problems and other related problems by providing a microlens adapter for mobile devices.

An embodiment includes a method that can be configured to produce many microlens configurations that have a micron optical resolution and a magnification from 15× and higher. Achieving similar optical resolution presently requires a microscope that costs approximately $15,000 in the market. Moreover, the whole setup of an embodiment is quite compact and easily portable for on-field applications relative to presently available high-resolution microscopes.

In particular embodiments, the microlens of the microlens adapter can distinguish micro particles that are of size 1 micron (1 millionth of a meter) which is not achievable by other lens adapters. A human hair is 100 microns in size for comparison. In one or more embodiments, the microlens adapter includes a housing (interchangeably referred to herein as a body) having a ball lens in an aperture of the housing, and the housing is configured to be coupled to a mobile device to position a lens of a camera of the mobile device in alignment with the ball lens and an object to be imaged. In particular embodiments, the ball lens that has short focal length in the range of 0.5 to a few mm (millimeters) and is constructed of glass. In an embodiment, the microlens adapter is constructed, formed, or machined to accommodate the ball lens at a particular location to hold the ball lens in place. In one or more embodiments, the microlens adapter includes an opening through which light from the object enters the ball lens to form an image on the back side of the ball lens. The microlens adapter further includes a recess on an outer surface dimensioned to accept an insert having an aperture hole therethrough. In a particular embodiment, the recess and insert are of a rectangular shape. In particular embodiments, the aperture hole has a diameter of 0.9 mm acting as an aperture to achieve both an optical resolution of 1 micron as well to limit spherical and other aberrations in optical imaging. In one or more embodiments, the aperture hole is in alignment with the lens of the camera of the mobile device to allow one or more images of the object to be captured from the ball lens through the aperture hole with minimal image distortion.

In particular embodiments, the microlens of the microlens adapter can distinguish micro particles that are of size 1 micron (1 millionth of a meter) which is not achievable by other lens adapters. A human hair is 100 microns in size for comparison. In one or more embodiments, the microlens adapter includes a housing (interchangeably referred to herein as a body) having an aspheric lens in an aperture of the housing, and the housing is configured to be coupled to a mobile device to position a lens of a camera of the mobile device in alignment with the aspheric lens and an object to be imaged. In particular embodiments, the aspheric lens that has a short focal length in the range of 5 to 30 mm (millimeters) and a diameter in the range of 10 to 25 mm and is constructed of glass or plastic. In an embodiment, the microlens adapter is constructed, formed, or machined to accommodate the aspheric lens at a particular location to hold it in place. In one or more embodiments, the microlens adapter includes an opening through which light from the object enters the aspheric lens to form an image on the back side of the aspheric lens. The microlens adapter further includes a recess on an outer surface dimensioned to accept an insert having an aperture hole there through. In a particular embodiment, the recess and insert are of a circular shape. In particular embodiments, the aperture hole has a diameter of 8 mm acting as an aperture to limit the cone of rays that form the image to limit spherical and other aberrations in optical imaging. It also helps to adjust or obtain the desired depth-of-field of the object under imaging. In one or more embodiments, the aperture hole is in alignment with the lens of the camera of the mobile device to allow one or more images of the object to be captured from the aspheric lens through the aperture hole with minimal image distortion.

An embodiment creates an image of a gem, e.g., a diamond, with the mobile device through a lens apparatus described herein, e.g., a wide-field lens. The embodiment captures one or more table-top images of the gem. An embodiment records different Z-sections of the gem. The embodiment creates a Z-composite image of the imaged gemstone to produce a view through the entirety of the gemstone.

Another embodiment uses one or more of the images described herein to uniquely identify gemstones that are being traded, e.g., by a sizeable client to a retailer. An embodiment provides specialized Artificial Intelligence (AI) techniques to identify the gemstones with the images recorded with a gem imager described herein, the images being recorded either previously or contemporaneously at the time of the trade. With the availability of a low-cost system formed by one or more embodiments, a gemstones retailer can provide a verification service—verifying the gemstones a consumer brings in for trade or some other service. Diamond and gems can be imaged at the point-of-sale and added to a database. When the customer wants to resell or verify the source with the retailer at a later point in time the gem images stored in the original seller's database can be used along with the AI algorithms provided by an embodiment. In one embodiment, an AI algorithm is optimized for gem identification or verification operation.

Any reference to an iPhone, cell phone, mobile phone, smart phone, or a variant thereof is a reference to a portable computing device having a form factor suitable for placement in a pocket of a garment. Such a portable device may, but need not, include the capability to conduct telephonic communications.

Any reference to an LED (light emitting diode) illumination, illuminator, light source, or some variant thereof is only depicted and intended as a non-limiting example. Any light source of a comparable form factor and amount of illumination can be used within the scope of the illustrative embodiments.

A reference to wide-field lens or some variant thereof is only depicted and intended as a non-limiting example. A lens of a form factor that allows it to be used in conjunction with a portable device contemplated herein, and having a field of view that is at least equal to or wider than the lenses found on commercial mobile phones, can be used within the scope of the illustrative embodiments.

A depicted enclosure or adapter may be omitted in an implementation of an embodiment. A motorized component can be configured to be movable by other mechanisms. A reflector shape and material can be altered to be other than a dome shape, e.g., a box shape, fabric reflector, and the like. An image contemplated herein may be black-and-white or color depending on the implementation and a specific circumstance of use.

Any reference to comparative words or adjectives, e.g., tightly/firmly, gently/strongly, small/large, fast/slow, and many others are with reference to respective thresholds as applicable to the term being qualified by the adjective. The threshold should be selected to avoid an undesirable effect related to the term. For example, "to press gently" should be interpreted as "to press while applying a force of less than a threshold force where the threshold force can undesirably deform or displace the object that is being pressed". As another example, "to tightly close (a light ring)" should be interpreted as "to close (the light ring) to a distance from the illuminated object where the distance is greater than a threshold distance where the threshold distance can undesirably cast shadows on the object that is being illuminated".

Figure 2:
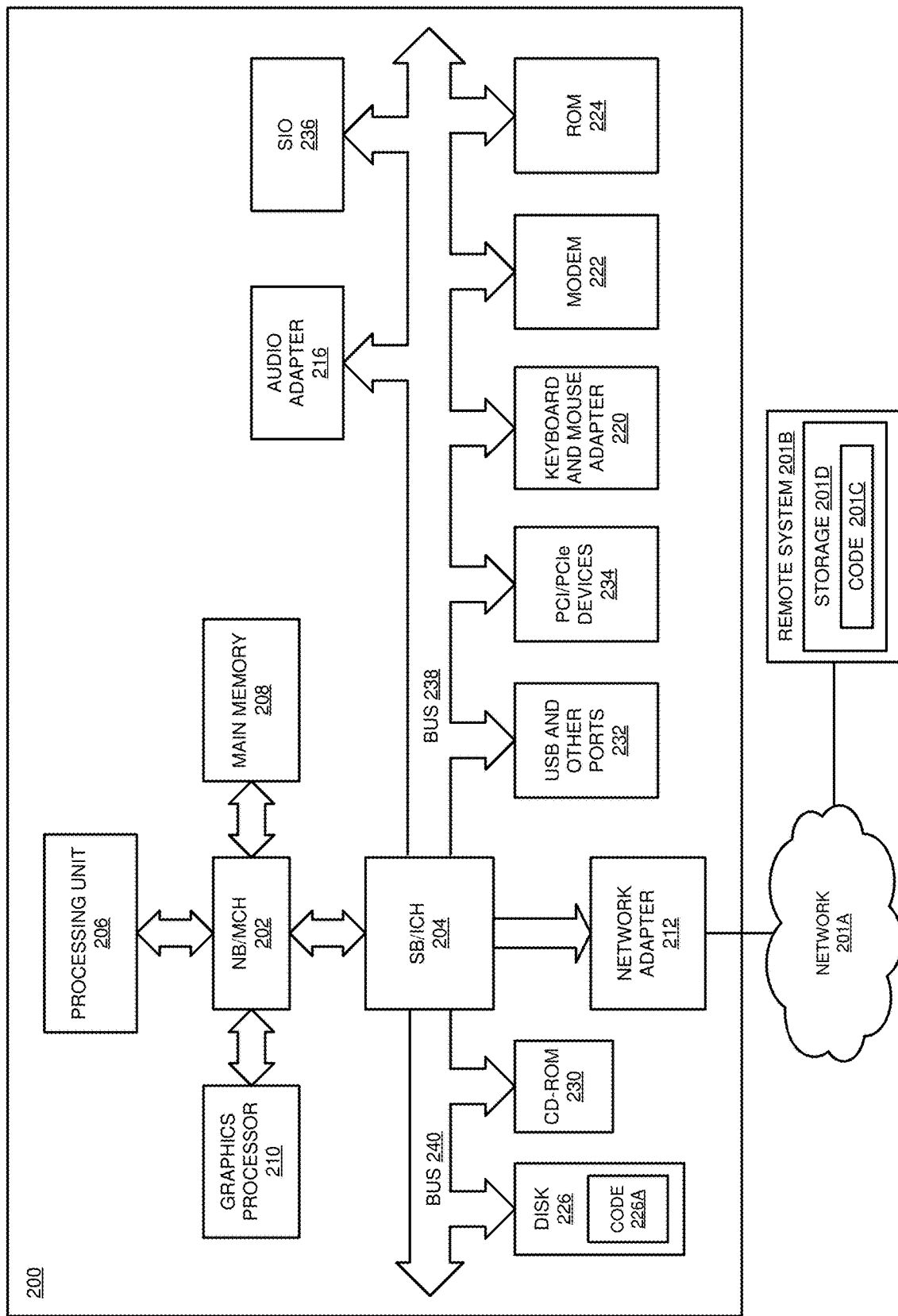
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Mobile device 132 is an example of a mobile device described herein. For example, mobile device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in mobile device 132 in a similar manner. Any data or information stored or produced in another data processing system in FIG. 1 can be configured to be stored or produced in device 132 in a similar manner. Mobile device 132 includes an imaging application 134 configured to capture one or more images or video sequences from a camera of mobile device 132. Mobile device 132 is further coupled to a gem imaging system 136 to facilitate capture of one or more images or videos sequences of an object through a microlens positioned within gem imaging system 136. Gem imaging system 136 is an example of a gem imaging system described herein.

Application 105 implements an embodiment described herein. For example, application 105 controls or instructs a manufacturing apparatus (not shown) to manufacture a microlens adapter that is usable in a manner described herein.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
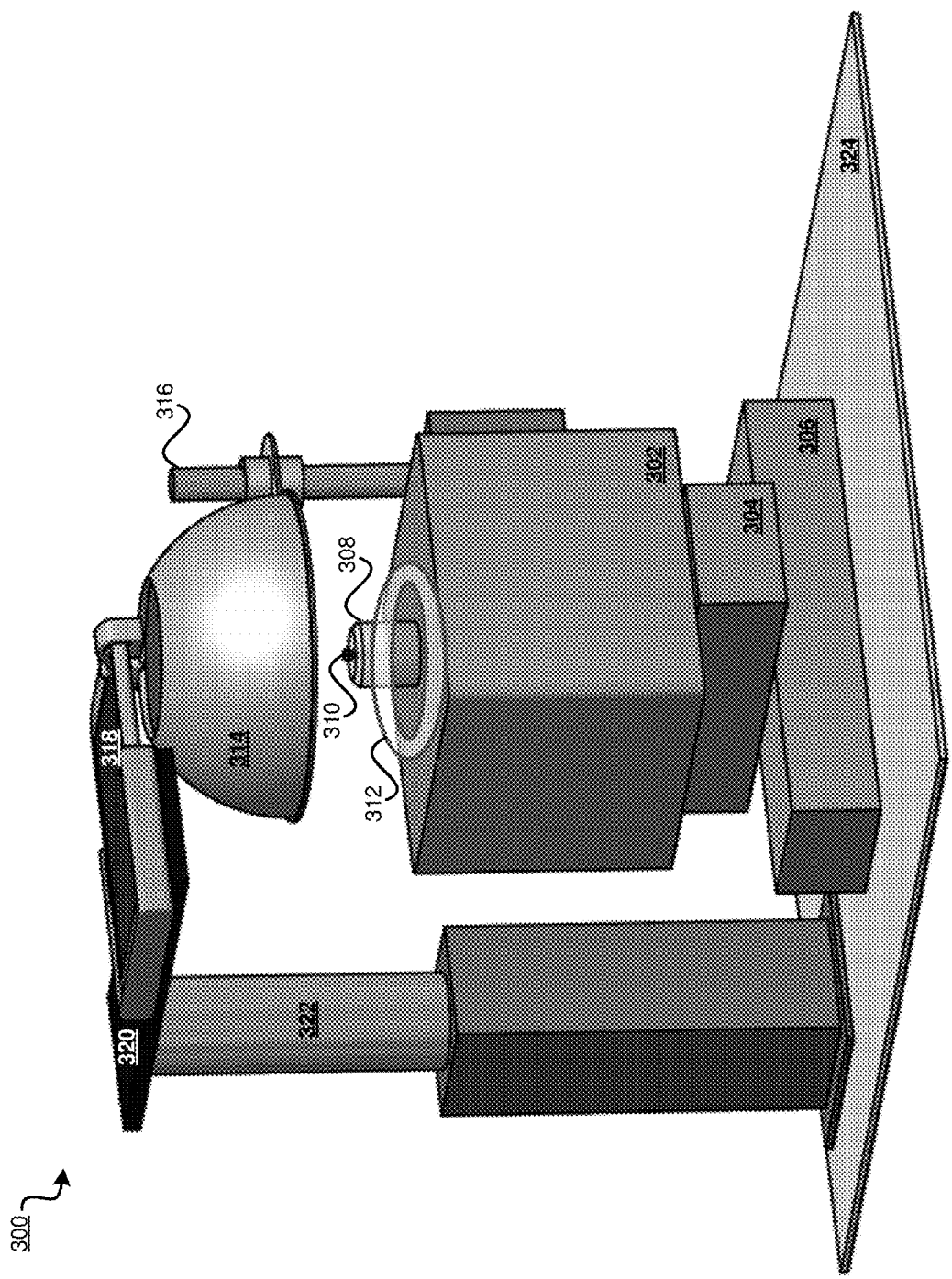
FIG. 3 depicts an example configuration of a gem imaging system in accordance with an illustrative embodiment.

FIG. 3 depicts an example configuration of gem imaging system 300 in accordance with an illustrative embodiment. Gem imaging system 300 is an example of gem imaging system 136 described herein. Gem imaging system rests on a surface 324. Gem imaging system 300 includes a platform arm 322 having a platform 320 configured to support placement of mobile device 318 upon platform arm 322. In particular embodiments, mobile device 318 is configured to be movable relative to gem stage 302. For example, platform arm 322 can adjust a height of the mobile device 318 relative to gem stage 302. In particular embodiments, mobile device 318 is configured to rotate relative to gem stage 302. For example, platform arm 322 can rotate about a longitudinal axis. In an embodiment, mobile device 318 is configured to rotate through a plane parallel to a surface of the gem stage 302. Mobile device 318 is an example of mobile device 132 described herein.

Gem imaging system 300 further includes a dome reflector 314 configured to be placed on and movable relative to a gem stage 302. Dome reflector 314 includes an opening at a top surface. Dome reflector 314 further includes a microlens adapter (not shown) including an aperture in alignment with a microlens (not shown). The aperture allows limiting the divergence of the light illuminating the sample from underneath to obtain better imaging conditions. In particular embodiments, dome reflector 314 is configured to be removable from gem stage 302. Dome reflector 314 includes an adjustable arm 316. Adjustable arm 316 is configured to move dome reflector 314 relative to gem stage 302. For example, adjustable arm 316 can be configured to adjust a height of the dome reflector 314 relative to gem stage 302. In particular embodiments, dome reflector 314 is configured to rotate relative to gem stage 302. For example, adjustable arm 316 can be configured to rotate about a longitudinal axis. Dome reflector 314 is configured to reflect light and illuminate a top surface of gem 310 for capturing images of gem 310 with gem imaging system 300.

Gem stage 302 further includes a light source 312 positioned on a top surface of gem stage 302. In particular embodiments, light source 312 includes modern LED chips mounted in a printed circuit board wired to a battery or power source. Gem stage 302 further includes gem platform 308. Gem platform 308 is configured to support placement of gem 310 upon gem stage 302. Gem platform 308 is configured to position gem 310 above LED ring light 312. When dome reflector 314 is lowered to rest on gem stage 302, dome reflector 314 reflects light from light source 312 to illuminate gem 310. Dome reflector 314 reflects light down onto gem 310 from above, illuminating a top surface of gem 310. In an embodiment, dome reflector 314 is a housing configured to at least partially enclose the gem 310. Gem stage 302 further includes mechanical stages 304, 306. Mechanical stages 304, 306 are motorized stages and control an x-y position of gem 310. Gem stage 302 further includes a motor (not shown) configured to control a z-position of gem 310. Gem stage 302 is configured to be movable in 10-100 micron increments to capture different z-position images of gem 310.

Figure 4:
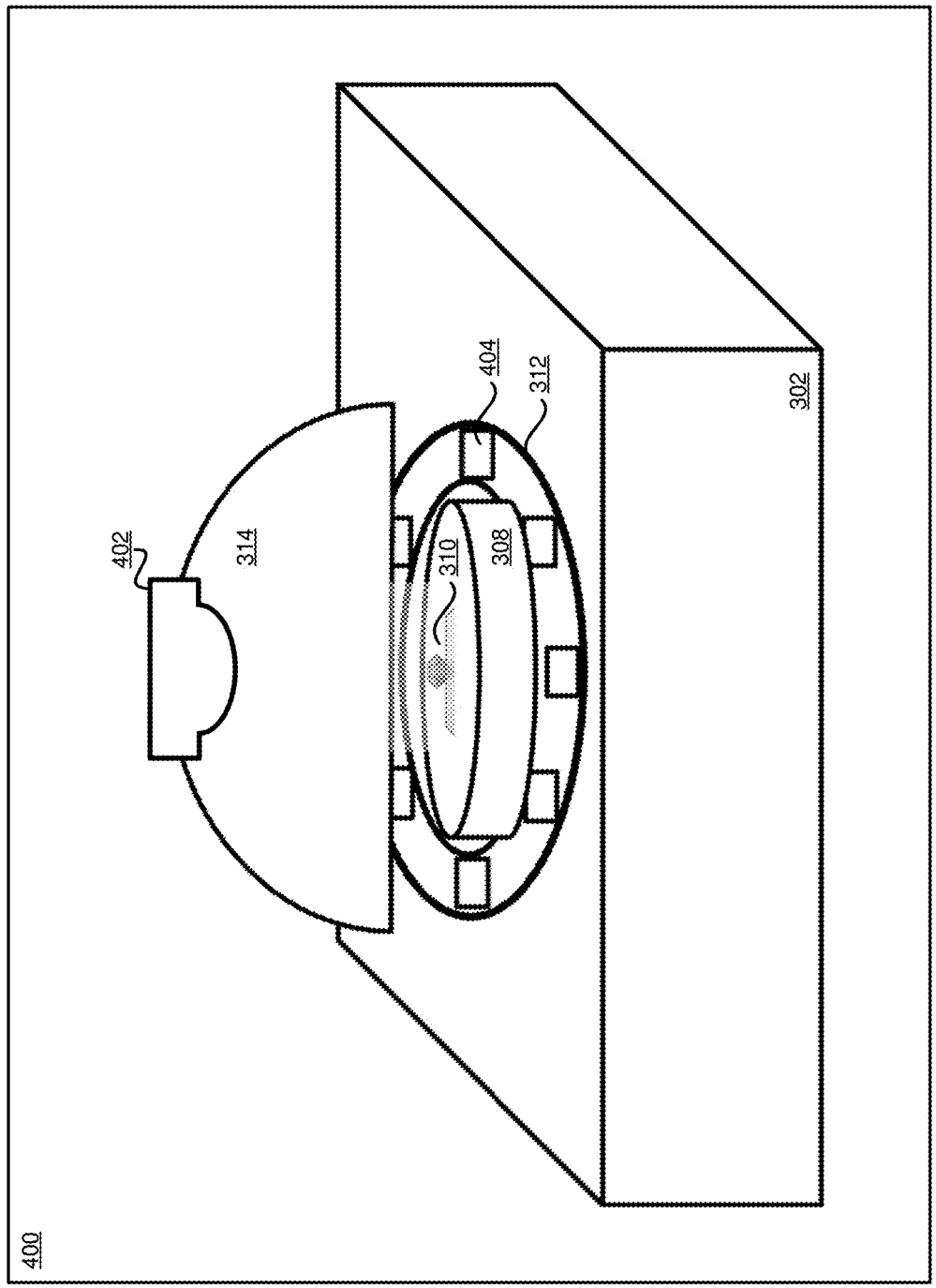
FIG. 4 depicts an example configuration of a dome reflector in accordance with an illustrative embodiment.

FIG. 4 depicts an example configuration 400 of dome reflector 314 in accordance with an illustrative embodiment. Similar to the embodiment of FIG. 3, dome reflector 314 further includes microlens adapter 402. Microlens adapter 402 is removably coupled to dome reflector 314. Microlens adapter 402 includes an aperture in alignment with a microlens (not shown). The aperture allows limiting the divergence of the light illuminating the sample from underneath to obtain better imaging conditions. Microlens adapter 402 is configured to removably couple to a mobile device, such as mobile device 318 in FIG. 3.

Example configuration 400 further includes a light source 312 positioned below gem 310 upon gem platform 308. Light source 312 is configured to direct light upon and/or illuminate gem 310 upward toward microlens adapter 402 and a camera lens (not shown) of mobile device 318. In a particular embodiment, light source 312 is a light emitting diode (LED) chip light source 404. In the embodiment, mobile device 318 is configured to capture still images and/or video images of gem 310 through microlens adapter 402 such that the images of gem 310 are magnified when captured.

Figure 5:
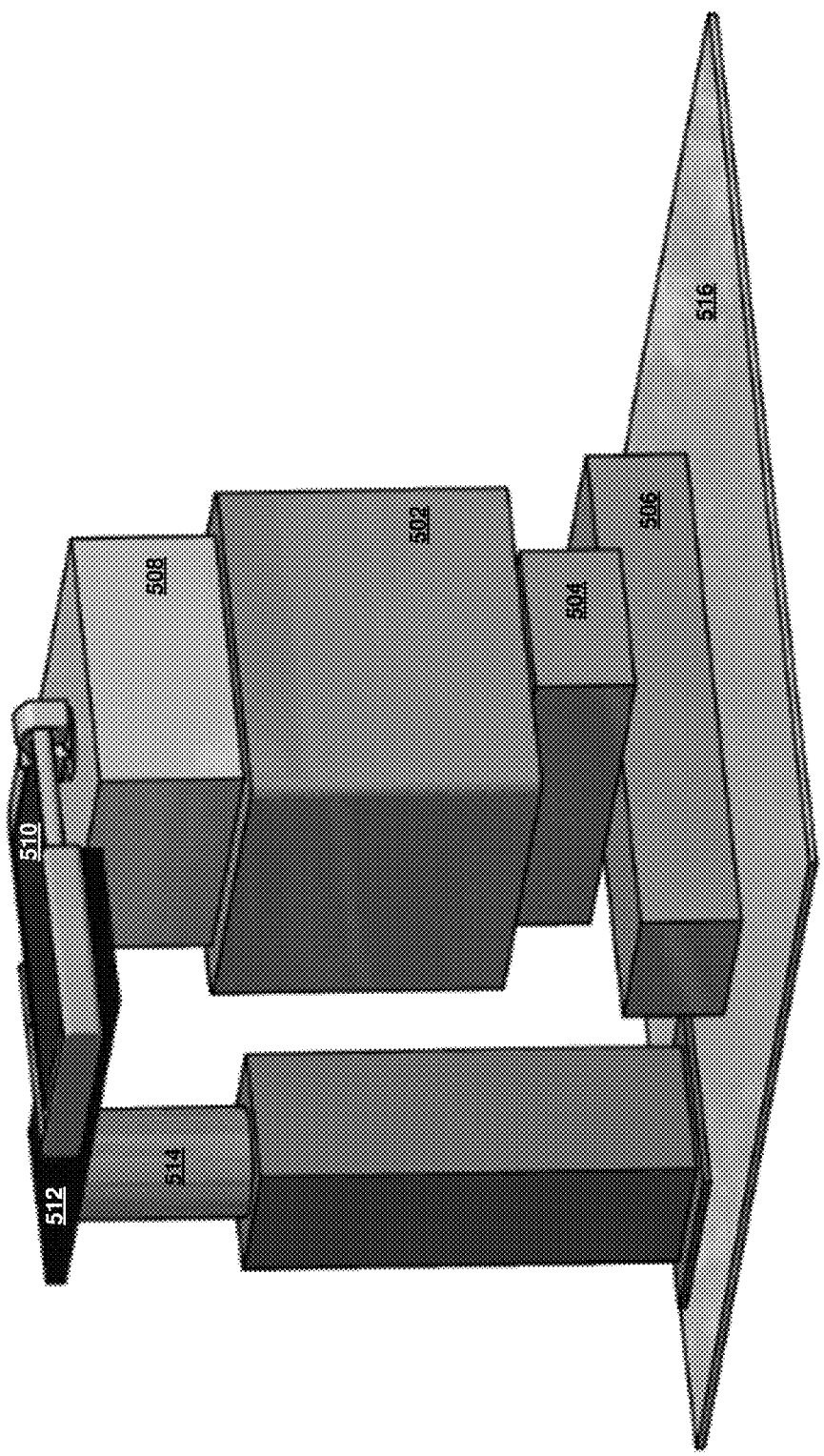
FIG. 5 depicts an example configuration of another gem imaging system in accordance with an illustrative embodiment.

FIG. 5 depicts an example configuration of another gem imaging system 500 in accordance with an illustrative embodiment. Gem imaging system 500 is an example of gem imaging system 136 described herein. Gem imaging system rests on a surface 516. Gem imaging system 500 includes a platform arm 514 having a platform 512 configured to support placement of mobile device 510 upon platform arm 514. In particular embodiments, mobile device 510 is configured to be movable relative to gem stage 502. For example, platform arm 514 can adjust a height of the mobile device 510 relative to gem stage 502. In particular embodiments, mobile device 510 is configured to rotate relative to gem stage 502. For example, platform arm 514 can rotate about a longitudinal axis. In an embodiment, mobile device 510 is configured to rotate through a plane parallel to a surface of the gem stage 502. Mobile device 510 is an example of mobile device 132 described herein.

Gem imaging system 500 further includes a housing 508 configured to be placed on and movable relative to a gem stage 502. In an embodiment, housing 508 at least partially encloses a gem. Housing 508 includes an opening at a top surface. Housing 508 further includes a microlens adapter (not shown) including an aperture in alignment with a microlens (not shown). The aperture allows limiting the divergence of the light illuminating the sample from underneath to obtain better imaging conditions. In particular embodiments, housing 508 is configured to be removable from gem stage 502. In particular embodiments, housing 508 is configured to reflect light and illuminate a top surface of a gem for capturing images of the gem with gem imaging system 500.

Gem stage 502 further includes mechanical stages 504, 506. Mechanical stages 504, 506 are motorized stages and control an x-y position of a gem. Gem stage 502 further includes a motor (not shown) configured to control a z-position of a gem. Gem stage 502 is configured to be movable in 10-100 micron increments to capture different z-position images of a gem.

Figure 6A:
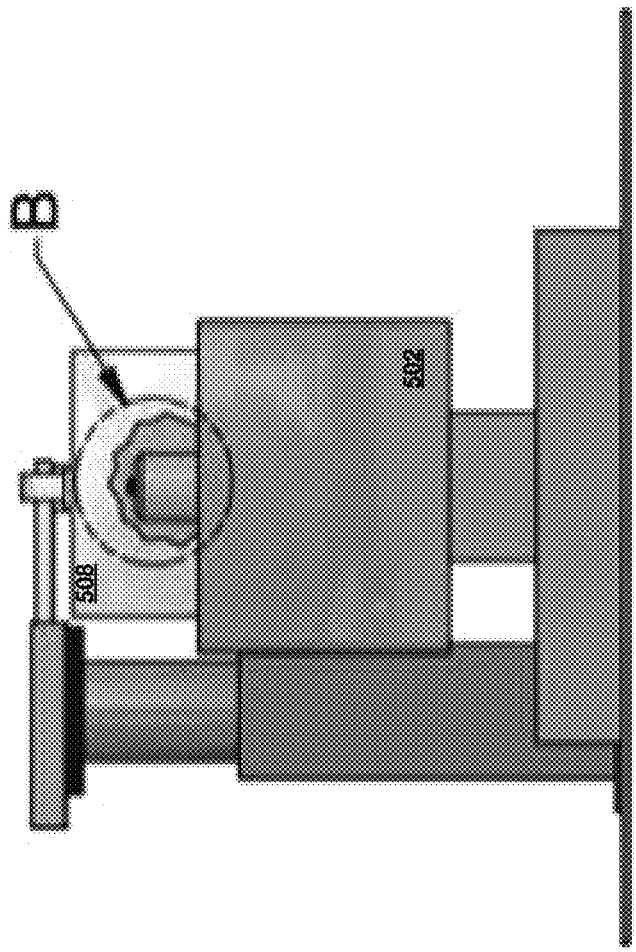
FIG. 6A depicts an example configuration of another gem imaging system in accordance with an illustrative embodiment.
Figure 6B:
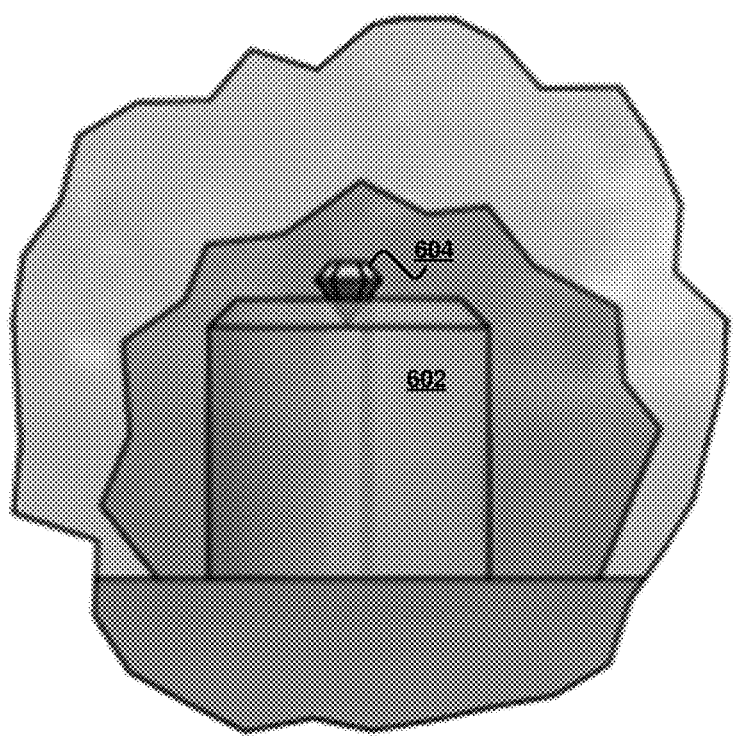
FIG. 6B depicts an example configuration of another gem imaging system in accordance with an illustrative embodiment.

FIGS. 6A and 6B depict an example configuration of gem imaging system 500 in accordance with an illustrative embodiment. Gem stage 502 further includes gem platform 602. Gem platform 602 is configured to support placement of gem 604 upon gem stage 502.

Figure 7:
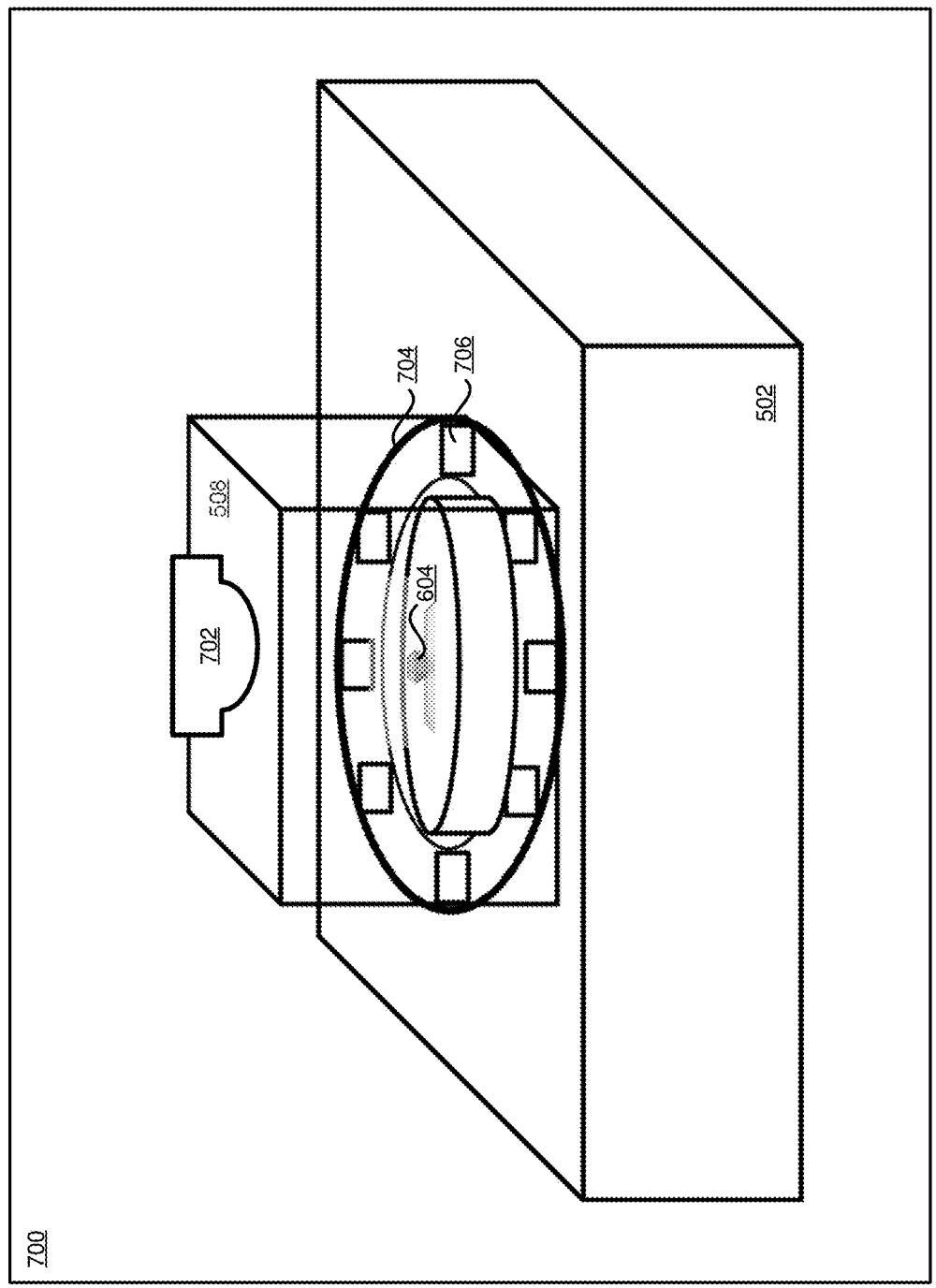
FIG. 7 depicts an example configuration of a housing of a gem imaging system in accordance with an illustrative embodiment.

FIG. 7 depicts an example configuration 700 of housing 508 in accordance with an illustrative embodiment. Similar to the embodiment of FIG. 5, housing 508 further includes microlens adapter 702. Microlens adapter 702 is removably coupled to housing 508. Microlens adapter 702 includes an aperture in alignment with a microlens (not shown). The aperture allows limiting the divergence of the light illuminating the sample from underneath to obtain better imaging conditions. Microlens adapter 702 is configured to removably couple to a mobile device, such as mobile device 510 in FIG. 5.

Example configuration 700 further includes a light source 704 positioned below gem 604 upon gem platform 602. Light source 704 is configured to direct light upon and/or illuminate gem 604 upward toward microlens adapter 702 and a camera lens (not shown) of mobile device 510. In a particular embodiment, light source 704 is coupled to housing 508. In a particular embodiment, light source 704 is a light emitting diode (LED) side panel coupled to housing 508. In a particular embodiment, light source 704 is a light emitting diode (LED) chip light source 706. In the embodiment, mobile device 510 is configured to capture still images and/or video images of gem 604 through microlens adapter 702 such that the images of gem 310 are magnified when captured.

Various embodiments of microlens adapter 136 described herein can be used in a number of applications in which magnified imaging of an object is desired. Example applications include, but are not limited to imaging defects and mapping of diamonds and other gems, drug or other packet recognition and counterfeit prevention, identification of microscopic features in art work and/or manufactured parts, biological cell imaging and counting, skin tissue imaging, detecting water pollutants, toxins, and/or large agglomerates of molecules, detecting plant leaf shape and type.

An embodiment can be implemented as a software application to control, guide, or instruct a fabrication machine or apparatus, to produce a microlens adapter for ubiquitous mobile devices, such as camera-equipped cellular phones. The application implementing an embodiment, or one or more components thereof, can be configured as a modification of an existing manufacturing system—i.e., a native application in the manufacturing system, as an application executing in a data processing system communicating with an existing manufacturing system over a local area network (LAN)—i.e., a local application on the LAN, as an application executing in a data processing system communicating with an existing manufacturing system over a wide area network (WAN)—i.e., a remote application on the WAN, as a separate application that operates in conjunction with an existing manufacturing system in other ways, a standalone application, or some combination thereof.

Another embodiment is the microlens adapter itself. Still another embodiment includes an observation configuration that uses a microlens adapter according to an embodiment. Another embodiment includes an observation configuration that uses a microlens adapter that has been manufactured using a software application according to an embodiment.

The manner of constructing or using a microlens adapter for mobile devices described herein is unavailable in the presently available methods. A method of an embodiment described herein, when implemented to execute on a device or data processing system, comprises substantial advancement of the functionality of that device or data processing system in fabricating and/or using a low-cost and portable microlens adapter for a variety of mobile devices.

The illustrative embodiments are described with respect to certain types of materials, shapes, orientations, experiments, usages, configurations, mobile devices, lens structures, illumination sources, observed specimen, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Thus, a computer implemented method, system or apparatus, and computer program product are provided in the illustrative embodiments for microlens adapter for mobile devices and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

While certain steps and processes are described with certain structures, it is to be understood that the steps and/or processes can be adapted to many variations of the structures described herein within the scope of the illustrative embodiments. While certain materials are used and described, it is to be understood that substitute materials or different but functionally equivalent materials can be used in place of the materials described herein within the scope of the illustrative embodiments. While certain methods have been used at certain steps, it is to be understood that a method may be omitted, added, or modified at a described step to achieve functionally similar result from the structure within the scope of the illustrative embodiments. While certain operations are described as a "step", several operations can be combined together to form a single step in a process described herein. While certain orientations have been referred to as "top," "bottom," "above," "below," "over,", or "under" with reference to an example orientation of a device or component, it is to be understood that the device or component can be reoriented such that the top and bottom become left/right or right/left, or bottom and top, or front/back or back/front, and other variations, as the reorientation case may be.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A gem imaging system comprising:
   a stage having a platform configured to hold an object above a first surface of the stage at an object height;
   a housing configured to at least partially enclose the object, wherein the housing is configured to position a mobile device such that a camera lens of the mobile device is aligned with the object; and
   a light source configured on a side surface of the housing, at a height above the first surface of the stage and below the object height, the light source configured to illuminate the object.

2. The system of claim 1, further comprising a microlens adapter configured to removably couple to the mobile device, wherein the microlens adapter includes a microlens, the microlens positioned in an aperture of the housing.

3. The system of claim 2, wherein the microlens is one of a bell lens, a hemispherical lens, a hyperbolic lens, or an aspheric lens.

4. The system of claim 1, further comprising a second platform configured to support the mobile device.

5. The system of claim 4, wherein the second platform is movable relative to the stage.

6. The system of claim 1, further comprising an arm coupled to the housing.

7. The system of claim 6, wherein the arm is configured to move the housing relative to the stage.

8. The system of claim 1, wherein the stage is movable in increments of 10 to 100 microns.

9. The system of claim 1, wherein the housing includes a light reflector oriented relative to the platform such that light from the light source is reflected from the light reflector onto the object.

10. The system of claim 1, wherein the light source is a lighting panel.

11. The system of claim 1,
    a motorized mechanism to move the platform in at least one direction to change a position of the object relative to the mobile device.

12. The system of claim 1, wherein the platform is configured to hold the object at a focal plane of a microlens.

13. A method comprising:
    instructing a manufacturing apparatus to fabricate a stage having a platform such that the platform is configured to hold an object above a first surface of the stage at an object height, a housing configured to at least partially enclose the object, wherein the housing is configured to position a mobile device such that a camera lens of the mobile device is aligned with the object, and a light source configured on a side surface of the housing, at a height above the first surface of the stage and below the object height, the light source configured to illuminate the object.

14. The method of claim 13, further comprising:
    instructing the manufacturing apparatus to fabricate a microlens adapter configured to removably couple to the mobile device, wherein the microlens adapter includes a microlens, the microlens positioned in an aperture of the housing.

15. The method of claim 14, wherein the microlens is one of a bell lens, a hemispherical lens, a hyperbolic lens, or an aspheric lens.

16. The method of claim 13, further comprising:
    instructing the manufacturing apparatus to fabricate a second platform configured to support the mobile device.

17. The method of claim 16, wherein the second platform is movable relative to the stage.

18. The method of claim 13, further comprising:
    instructing the manufacturing apparatus to fabricate an arm coupled to the housing.

19. The method of claim 18, wherein the arm is configured to move the housing relative to the stage.

20. A computer usable program product comprising one or more computer-readable storage media, and program instructions stored on at least one of the one or more storage media, the stored program instructions comprising:
    program instructions to cause a manufacturing apparatus to fabricate a stage having a platform such that the platform is configured to hold an object above a first surface of the stage at an object height, a housing configured to at least partially enclose the object, wherein the housing is configured to position a mobile device such that a camera lens of the mobile device is aligned with the object, and a light source configured on a side surface of the housing, at a height above the first surface of the stage and below the object height, the light source configured to illuminate the object.

* * * * *